United States Patent
Okubo et al.

(10) Patent No.: US 12,274,202 B2
(45) Date of Patent: Apr. 15, 2025

(54) GRASS MOWER WITH TWO MOWING HEIGHTS

(71) Applicant: HONDA MOTOR CO., LTD., Tokyo (JP)

(72) Inventors: Susumu Okubo, Wako (JP); Kohei Matsuzawa, Wako (JP); Kei Nakamura, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 741 days.

(21) Appl. No.: 17/574,143

(22) Filed: Jan. 12, 2022

(65) Prior Publication Data

US 2022/0232765 A1   Jul. 28, 2022

(30) Foreign Application Priority Data

Jan. 25, 2021   (JP) .................................. 2021-009808

(51) Int. Cl.
| | |
|---|---|
| *A01D 34/00* | (2006.01) |
| *A01D 34/54* | (2006.01) |
| *A01D 34/78* | (2006.01) |
| *A01D 34/81* | (2006.01) |
| *A01D 101/00* | (2006.01) |

(52) U.S. Cl.
CPC ............. *A01D 34/78* (2013.01); *A01D 34/54* (2013.01); *A01D 34/81* (2013.01); *A01D 34/008* (2013.01); *A01D 2101/00* (2013.01)

(58) Field of Classification Search
CPC ....... A01D 34/008; A01D 34/54; A01D 34/81
See application file for complete search history.

(56) References Cited

U.S. PATENT DOCUMENTS 5,463,855 A * 11/1995 Johnson ................. A01D 34/74
                                                              D8/395
2020/0221634 A1   7/2020 Nicholson

FOREIGN PATENT DOCUMENTS

| DE | 202007001868 U1 * | 7/2007 | ............. A01D 34/74 |
| GB | 2494242 A * | 3/2013 | ............. A01D 34/54 |
| JP | 2017-112927 | 6/2017 | |

OTHER PUBLICATIONS

German Office Action dated Apr. 9, 2024 issued in corresponding German application No. 10 2022 101 335.9; English translation included (12 pages).
German Search Report dated Apr. 9, 2024 issued in corresponding German application No. 10 2022 101 335.9; English translation included (13 pages).

* cited by examiner

*Primary Examiner* — Alicia Torres
(74) *Attorney, Agent, or Firm* — Rankin, Hill & Clark LLP

(57) ABSTRACT

Each side frame that supports a traveling machine body includes a front insertion support member and a rear insertion support member that can be inserted into a front support member and a rear support member, respectively. The grass mower includes bolts that are couplable selectively in a first state where the front insertion support member and the rear insertion support member are inserted between a front upper member and a rear upper member, and a front lower member and a rear lower member, respectively, and a second state where the front insertion support member and the rear insertion support member are mounted on lower surfaces of the front lower member and the rear lower member, respectively.

9 Claims, 13 Drawing Sheets

GRASS MOWER WITH TWO MOWING HEIGHTS

INCORPORATION BY REFERENCE

The present application claims priority under 35 U.S.C. § 119 to Japanese Patent Application No. 2021-009808 filed on Jan. 25, 2021. The content of the application is incorporated herein by reference in its entirety.

BACKGROUND OF THE INVENTION

Field of the Invention

The present invention relates to a grass mower.

Description of the Related Art

Heretofore, there has been disclosed a technology of adjusting a mowing height by raising and lowering a mowing blade relative to a mower body in a grass mower, particularly an autonomous grass mower (e.g., see Japanese Patent Laid-Open No. 2017-112927).

In this technology, the grass mower body does not have any change in relative position of height with respect to the ground, and a mowing blade unit only changes in position in an up-down direction.

According to a technology of raising and lowering a mowing blade itself in Japanese Patent Laid-Open No. 2017-112927 mentioned above, however, there is a restriction on a size of a traveling machine body, and thus a change width of a mowing height varies according to the restriction.

In general, multiple types of grass mowers having sizes corresponding to sizes of respective yards are manufactured and sold, but the change width of the mowing height varies with the size of the traveling machine body.

Also, it is general that the mowing height is 60 mm at maximum in Europe, and 100 mm at maximum in America, and there is regionality in lawn mowing height. Therefore, it is necessary to remake a frame case in accordance with the regionality in mowing height, and thus it is necessary to invest in respective molding molds.

Consequently, an object of the present invention, which has been made in view of the above respects, is to provide a grass mower that can achieve various mowing heights by changing mounting positions of a traveling machine body and a working machine body.

SUMMARY OF THE INVENTION

To achieve the above object, an aspect of the present invention provides a grass mower including a traveling machine body including a driving source and a driving part driven by the driving source; and a working machine body including a mowing blade, the working machine body being coupled to the traveling machine body, wherein one of the traveling machine body and the working machine body includes a support member including an upper member and a lower member, and the other machine body includes an insertion support member being insertable between the upper member and the lower member, the grass mower including a coupling member that is couplable selectively in a first state where the insertion support member is inserted between the upper member and the lower member, and a second state where the insertion support member is mounted on an upper surface of the upper member or a lower surface of the lower member.

In the above configuration, each of the upper member, the lower member and the insertion support member is provided with a coupling hole, and the coupling member is passed through the coupling hole to couple the upper member and the lower member to the insertion support member.

In the above configuration, the traveling machine body and the working machine body are coupled with a first coupling member that couples the traveling machine body with the working machine body in the front and a second coupling member that couples the traveling machine body with the working machine body in the rear.

In the above configuration, one of the insertion support member being coupled with the first coupling member and the insertion support member being coupled with the second coupling member is disposed in a front end of the traveling machine body or the working machine body, and the other insertion support member is disposed laterally with respect to a front-rear direction.

The above configuration includes a gap member that surrounds a gap between the upper member and the lower member in the coupling member, during coupling in the second state.

In the above configuration, the gap member is an elastic body.

The above configuration includes a metal collar disposed between the coupling member and the gap member.

The above configuration includes two side frames each including the driving part, a rear frame including the driving source, and a front frame including the mowing blade and a mowing blade driving source that drives the mowing blade.

In the above configuration, the side frame and the front frame are coupled with the coupling member.

Advantageous Effect of Invention

According to an aspect of the present invention, a grass mowing work can be performed at two mowing heights by selecting a first state or a second state, and coupling and fixing a support member and an insertion support member. Therefore, mowing height adjustment can be performed in a comparatively large range with one type of frame configuration, and multiple frame configurations do not have to be prepared for the mowing height adjustment, and additionally, manufacturing cost can be reduced.

DETAILED DESCRIPTION OF THE PREFERRED EMBODIMENT

Hereinafter, description will be made as to an embodiment of the present invention with reference to the drawings.

Figure 1:
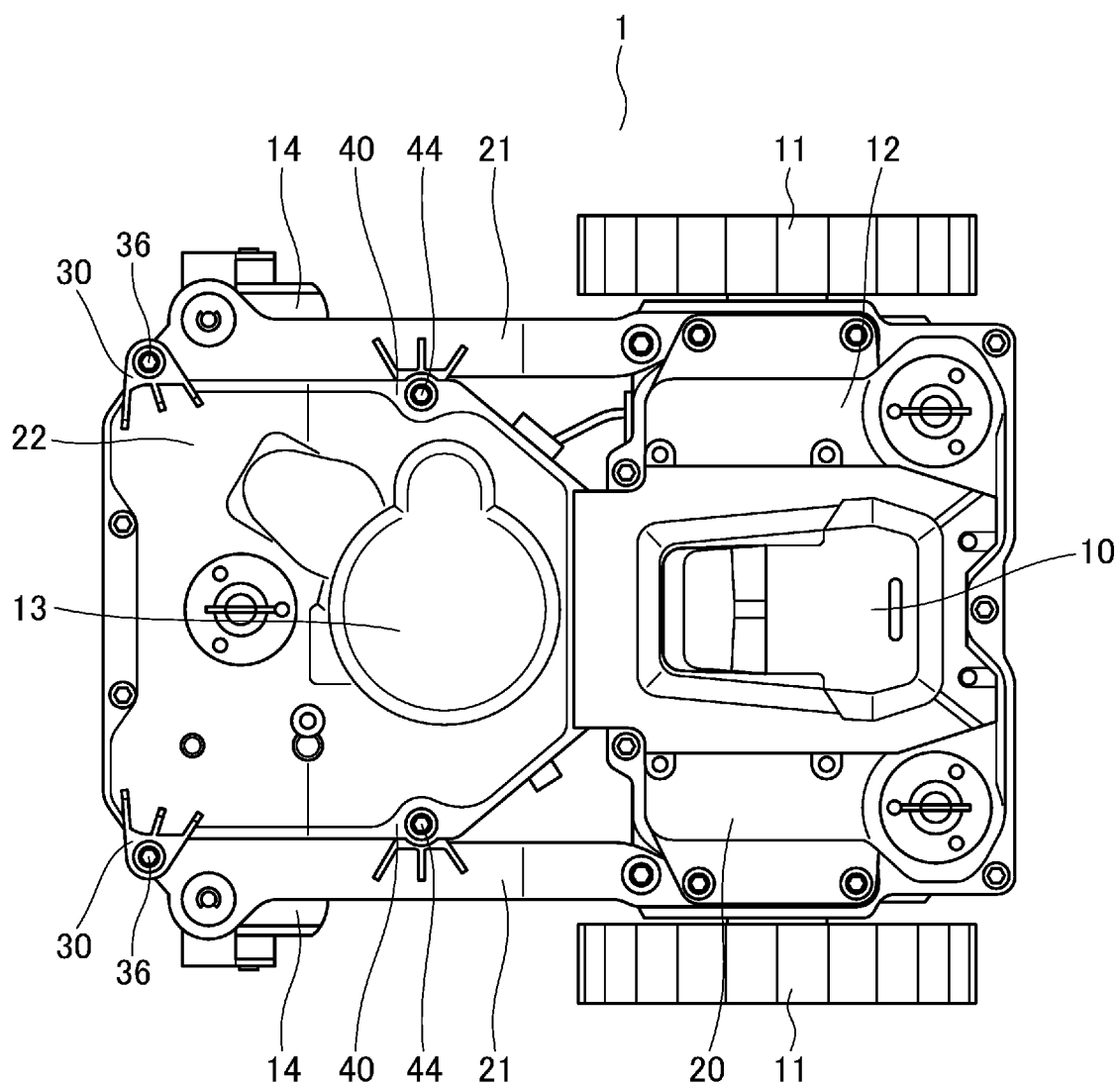
FIG. 1 is a plan view showing a structure of a grass mower according to the present invention.
Figure 2:
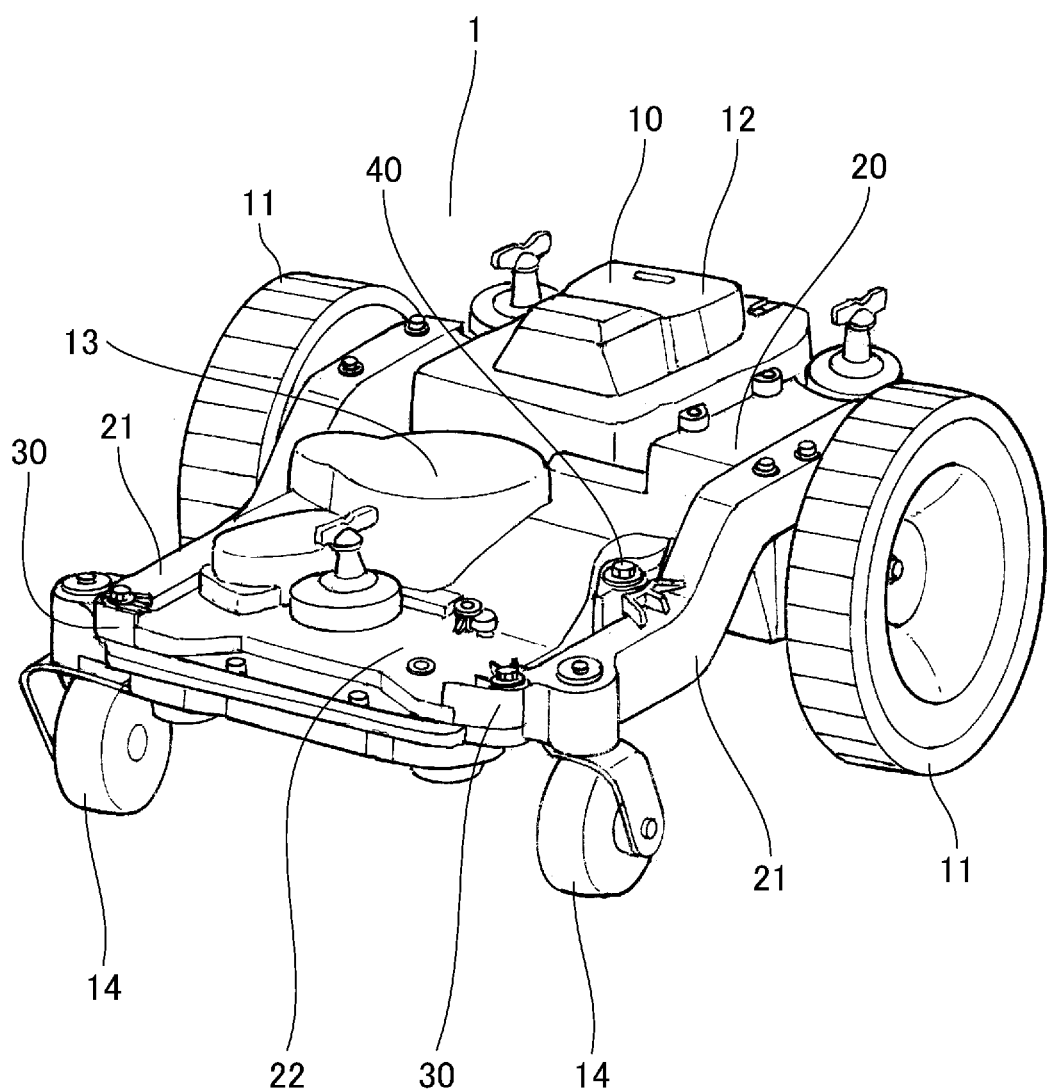
FIG. 2 is a perspective view showing a first state of the grass mower seen from front.
Figure 3:
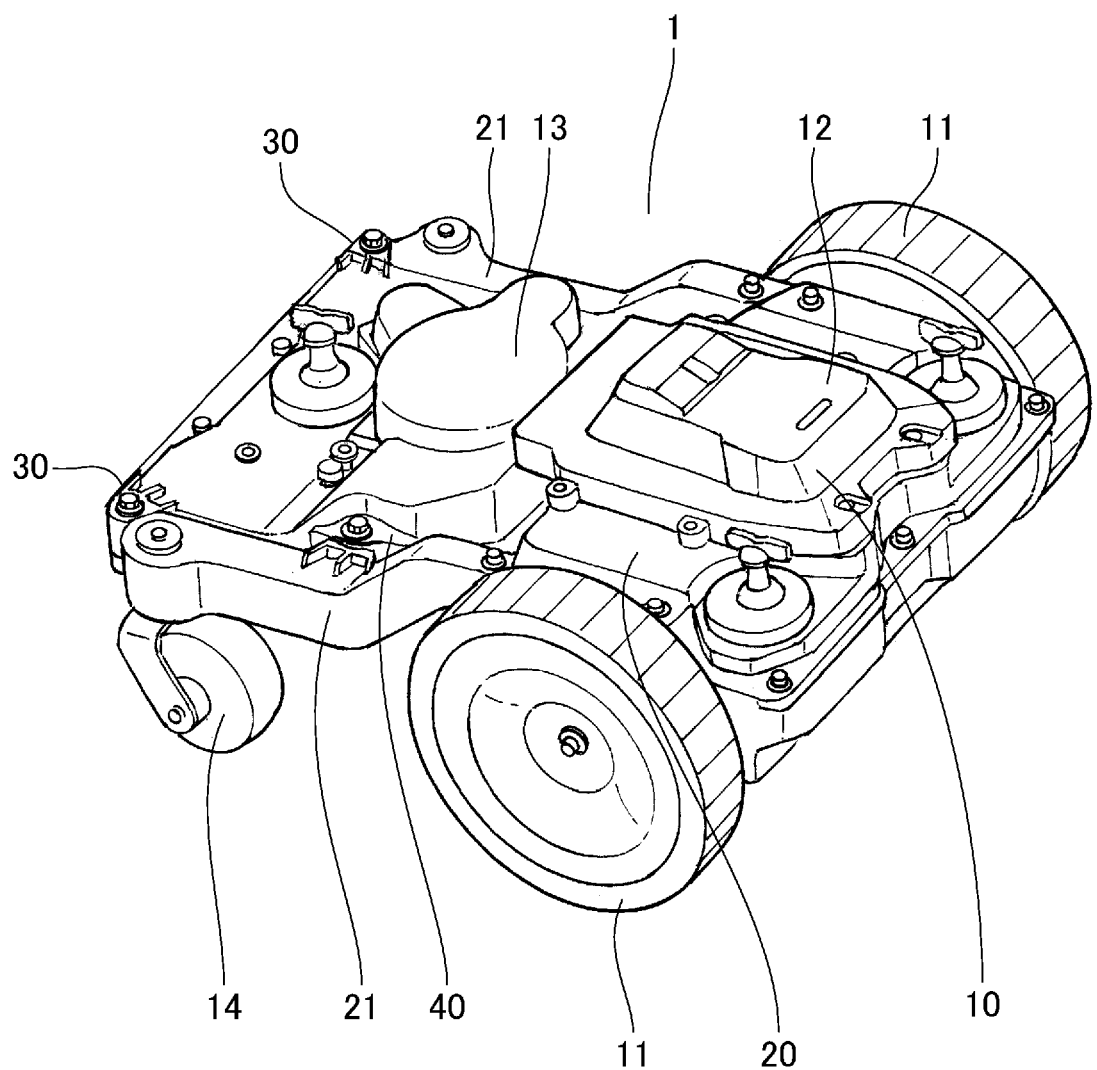
FIG. 3 is a perspective view showing the first state of the grass mower seen from rear.
Figure 4:
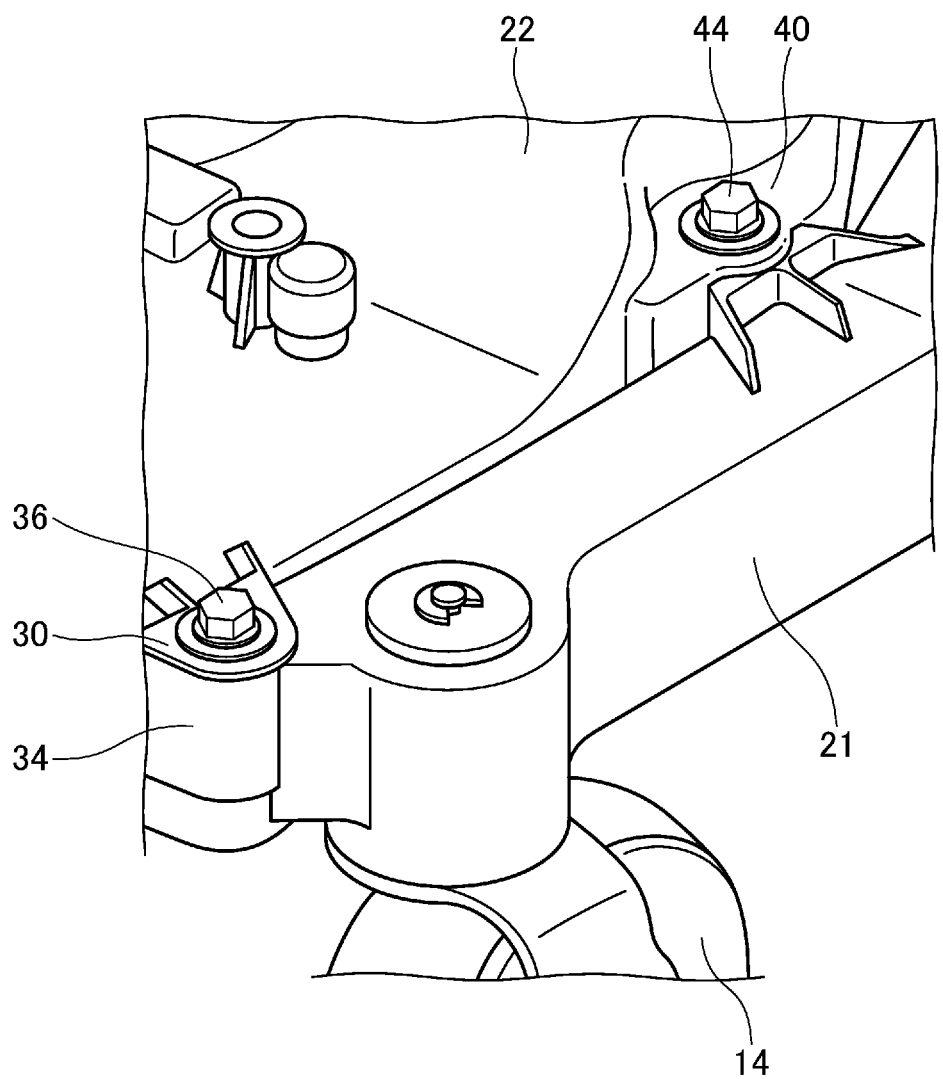
FIG. 4 is a perspective view of a front support member part in the first state.
Figure 5:
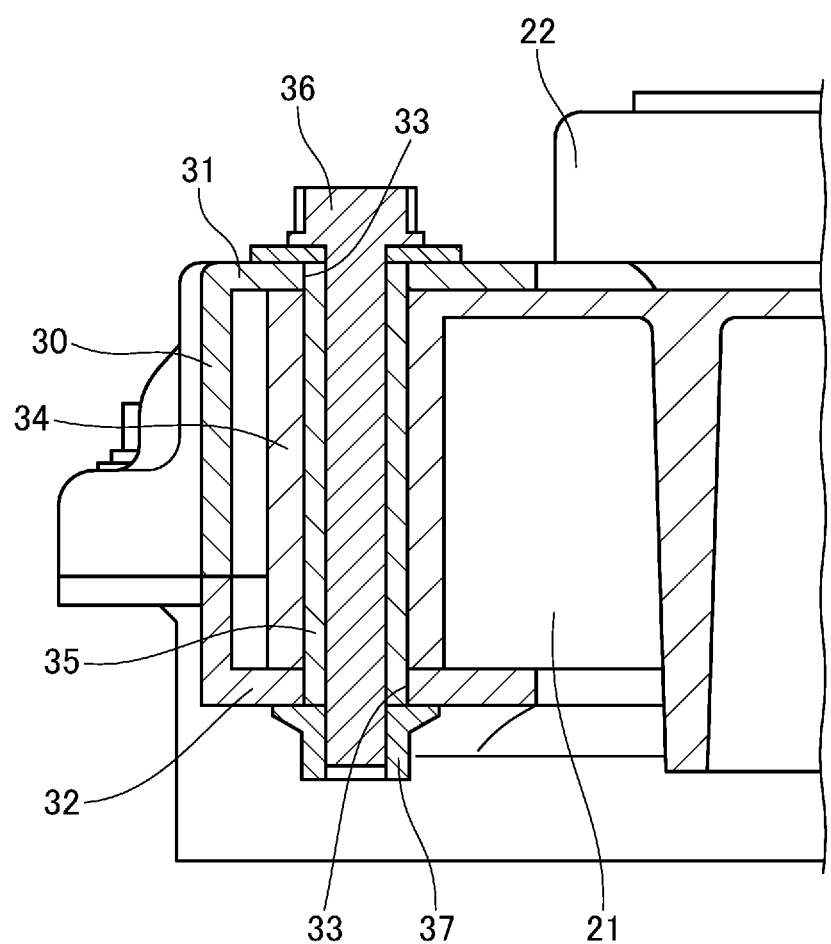
FIG. 5 is a cross-sectional view of the front support member part in the first state.
Figure 6:
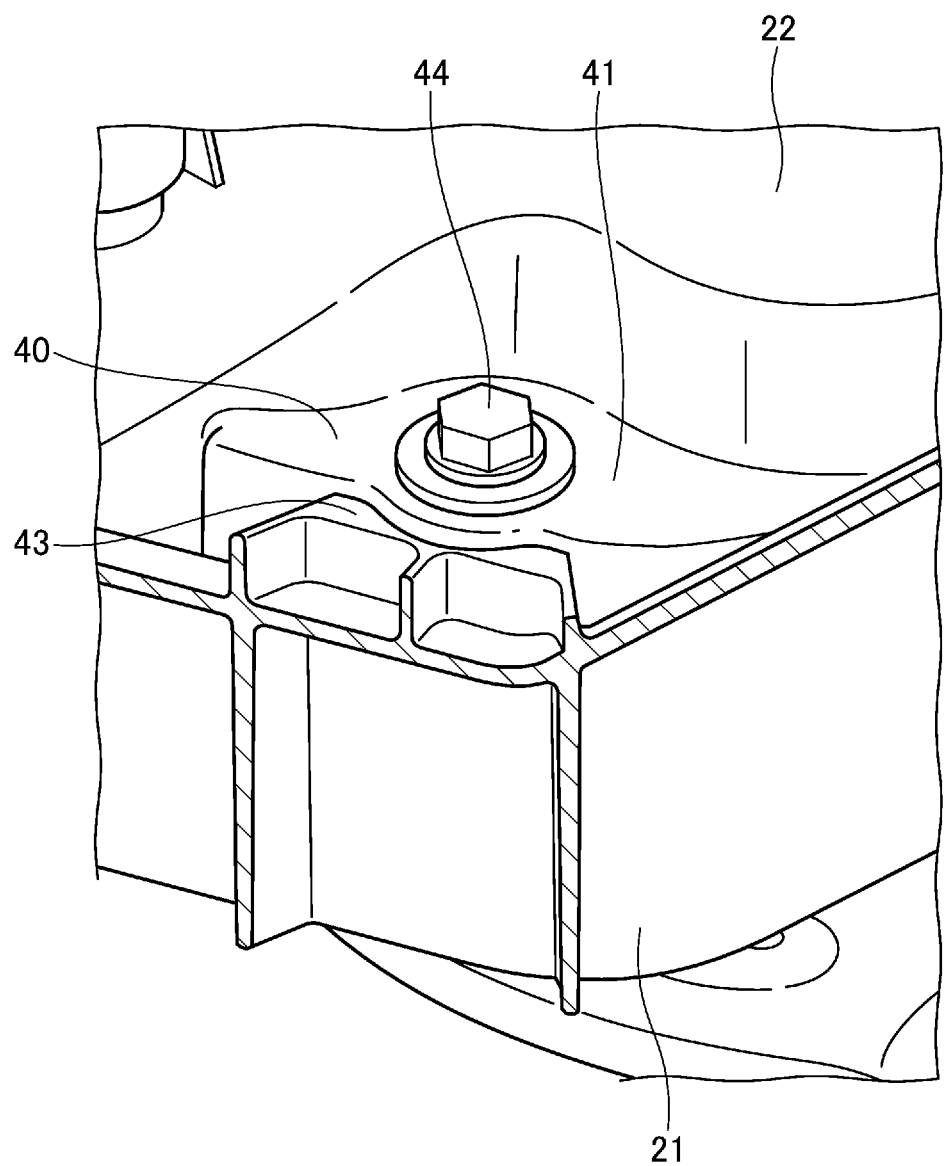
FIG. 6 is a perspective view of a rear support member part in the first state.
Figure 7:
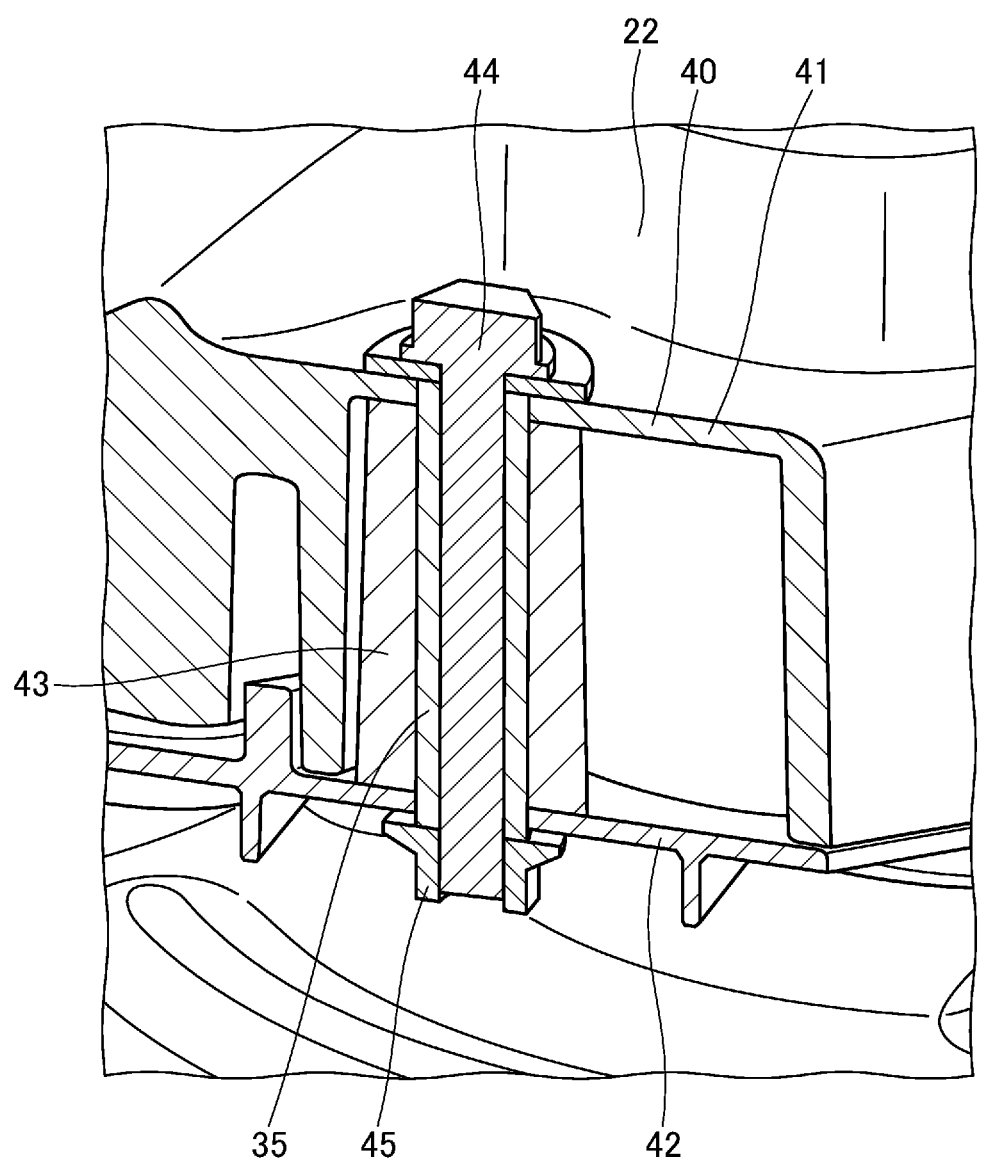
FIG. 7 is a cross-sectional view of the rear support member part in the first state.
Figure 8:
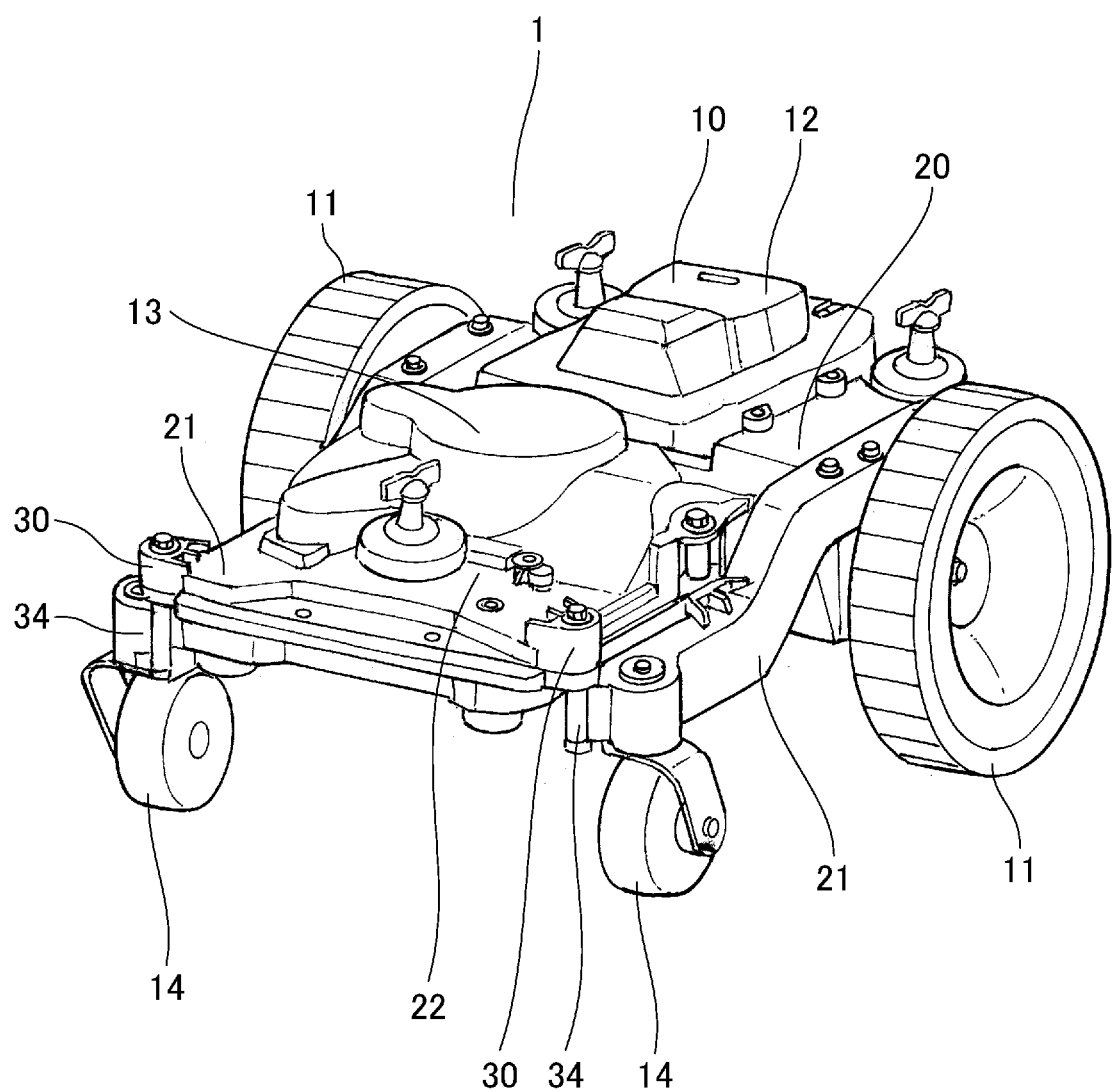
FIG. 8 is a perspective view showing a second state of the grass mower seen from front.
Figure 9:
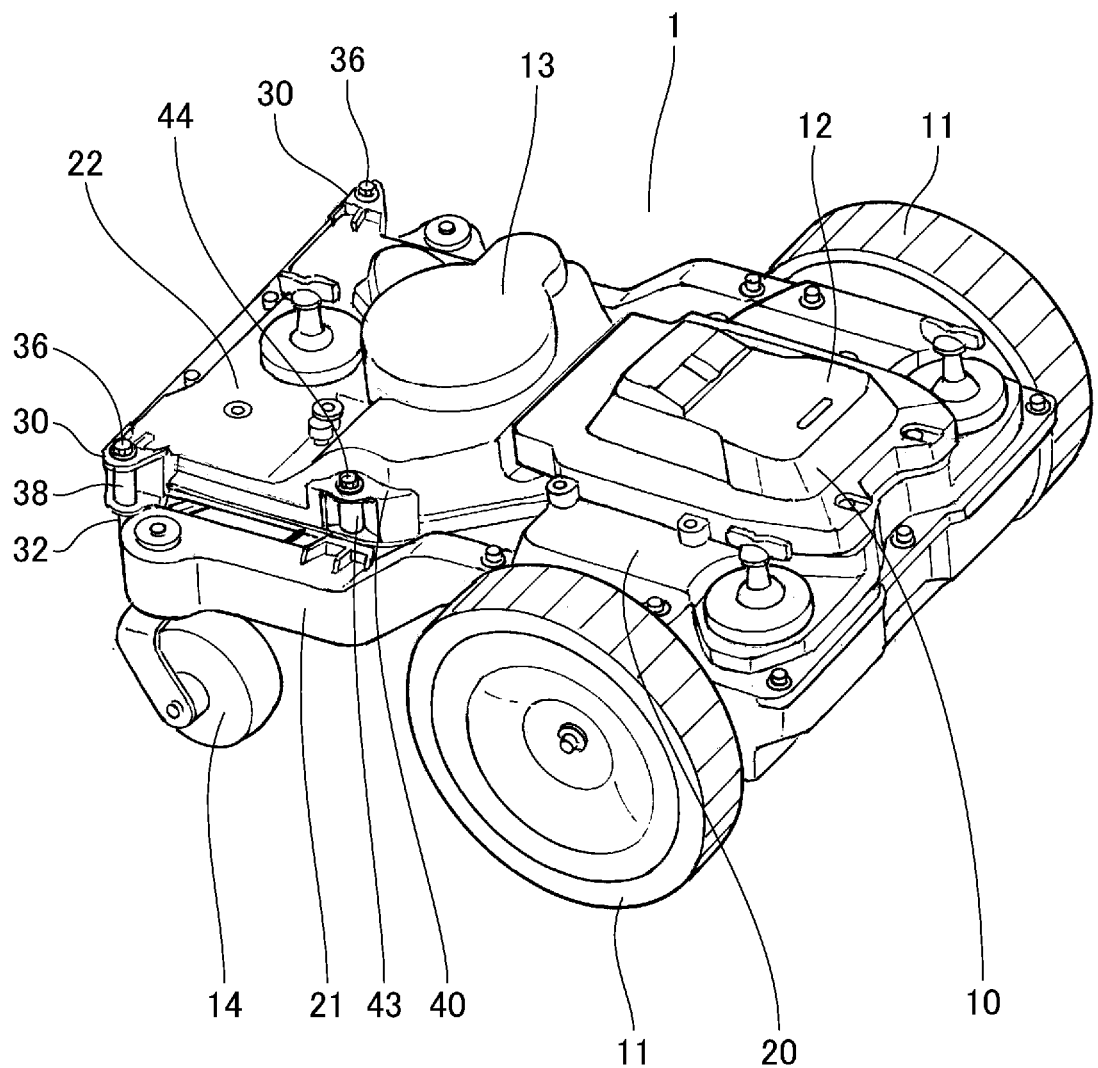
FIG. 9 is a perspective view showing the second state of the grass mower seen from rear.
Figure 10:
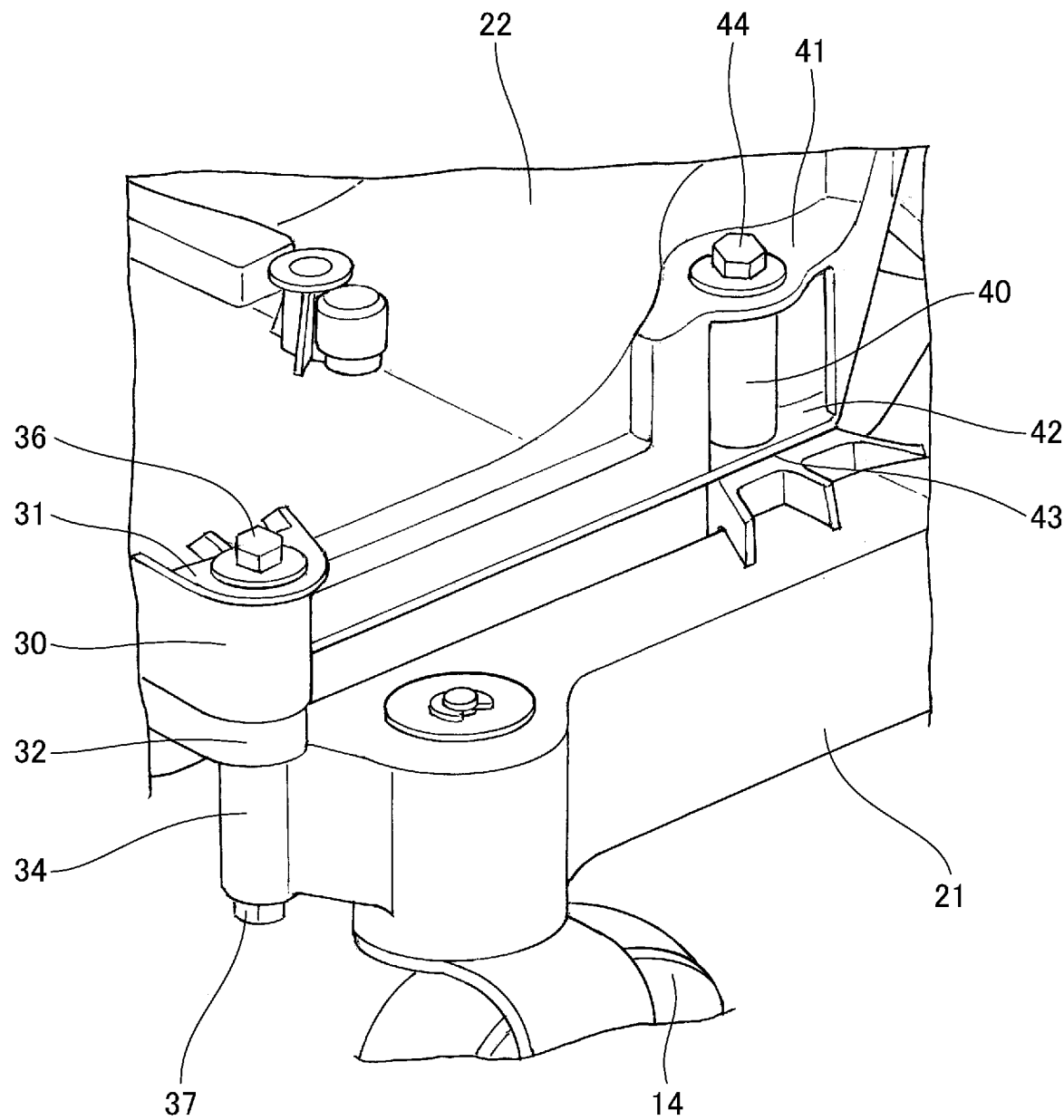
FIG. 10 is a perspective view of the front support member part in the second state.
Figure 11:
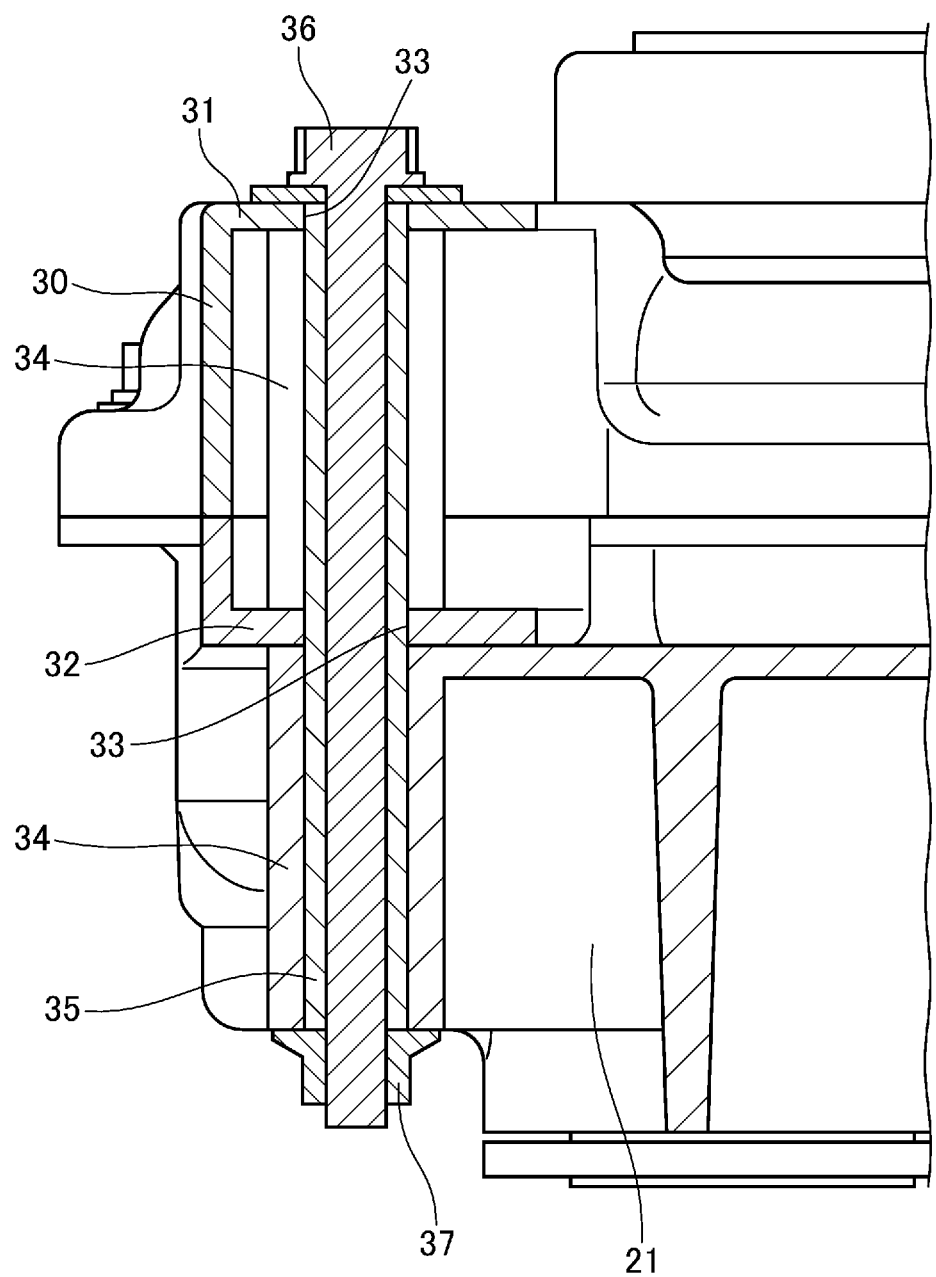
FIG. 11 is a cross-sectional view of the front support member part in the second state.
Figure 12:
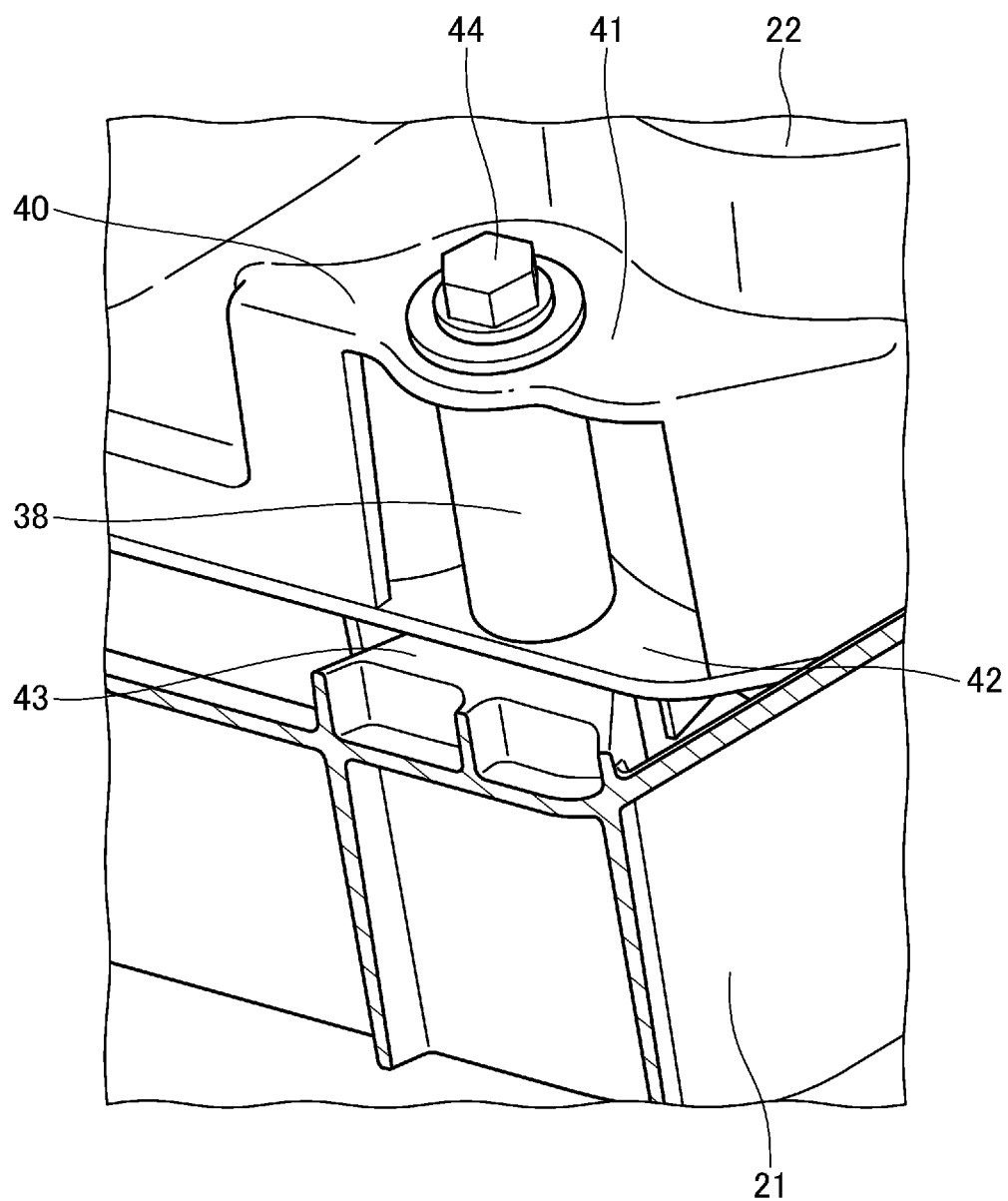
FIG. 12 is a perspective view of the rear support member part in the second state.
Figure 13:
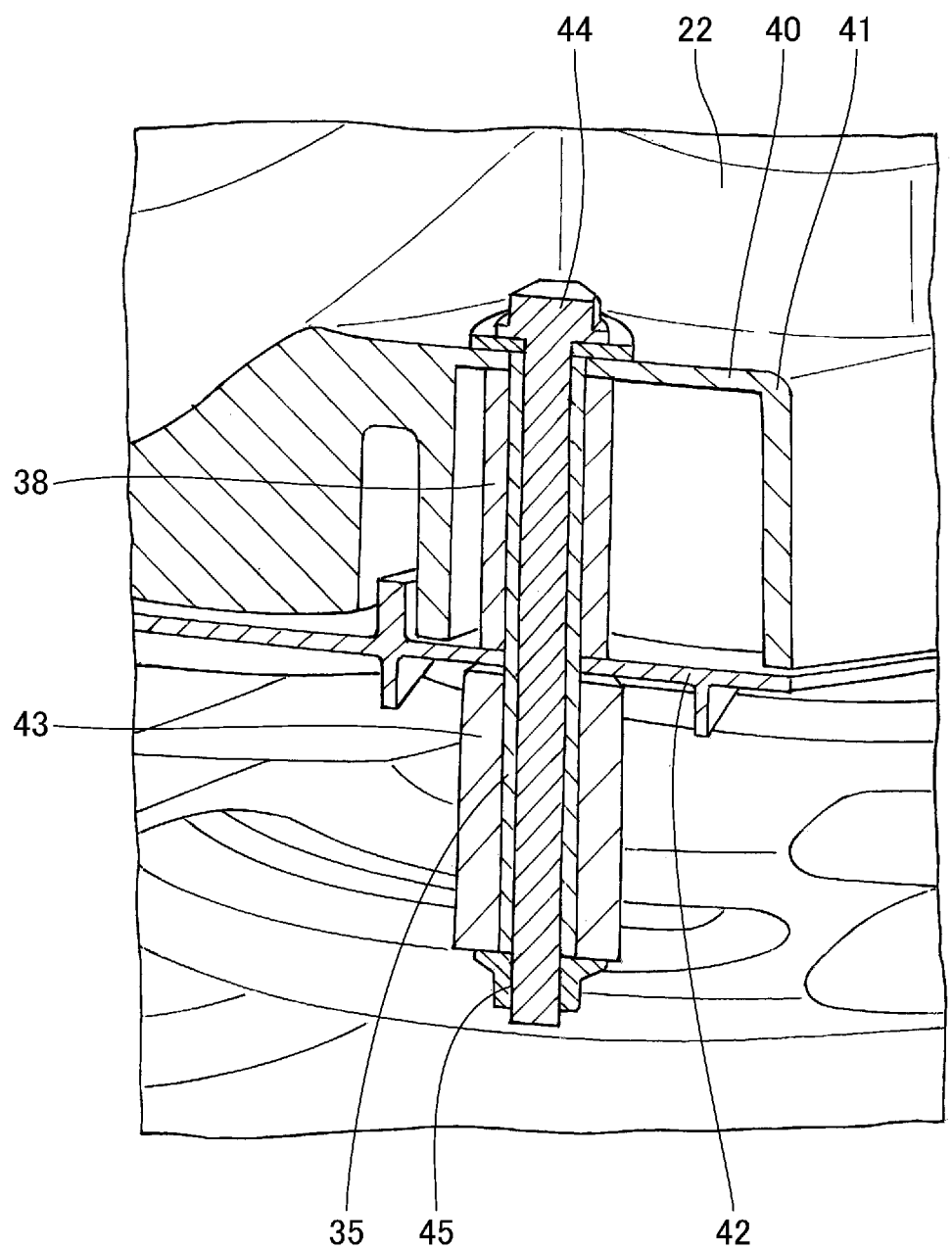
FIG. 13 is a cross-sectional view of the rear support member part in the second state.

FIG. 1 is a plan view showing a structure of a grass mower. FIG. 2 is a perspective view showing a first state of the grass mower seen from front. FIG. 3 is a perspective view showing the first state of the grass mower seen from rear. FIG. 4 is a perspective view of a front support member part in the first state. FIG. 5 is a cross-sectional view of the front support member part in the first state. FIG. 6 is a perspective view of a rear support member part in the first state. FIG. 7 is a cross-sectional view of the rear support member part in the first state. FIG. 8 is a perspective view showing a second state of the grass mower seen from front. FIG. 9 is a perspective view showing the second state of the grass mower seen from rear. FIG. 10 is a perspective view of the front support member part in the second state. FIG. 11 is a cross-sectional view of the front support member part in the second state. FIG. 12 is a perspective view of the rear support member part in the second state. FIG. 13 is a cross-sectional view of the rear support member part in the second state.

As shown in FIG. 1, a grass mower 1 is an autonomous traveling grass mower 1 that can autonomously travel without being operated by an operator.

The grass mower 1 includes a traveling machine body 12 including a traveling motor 10 as a driving source and driving wheels 11 as driving parts each driven by the traveling motor 10, and a working machine body 13 including a mowing blade (not shown in the drawing), the working machine body being coupled to the traveling machine body 12.

The traveling machine body 12 includes a rear frame 20, and a pair of side frames 21 provided on right and left of the rear frame 20.

The traveling motor 10 is disposed in the rear frame 20, and each driving wheel 11 is rotatably driven, and supported in each side frame 21. The respective driving wheels 11 can be individually driven by the traveling motor 10, and the grass mower 1 is driven to travel and driven to roll, by individually driving the driving wheels 11.

In a front end of each side frame 21, a steering wheel 14 steerable to right and left is provided.

In front of the pair of side frames 21, a front frame 22 is provided. In the front frame 22, the working machine body 13 is disposed.

The working machine body 13 includes a mowing blade motor as a mowing blade driving source, and a mowing blade disk that is a circular disk provided with the mowing blade (each part is not shown in the drawing), and lawn can be mowed by driving and rotating the mowing blade disk with the mowing blade motor.

In addition, a cover that covers all of the front frame 22, the rear frame 20 and the side frames 21 is mounted above the frames, and the cover is not shown in the drawing.

In the present embodiment, as shown in FIGS. 2, 3, 11 and 12, front support members 30 are provided in front corners of the front frame 22. Each front support member 30 includes a front upper member 31 and a front lower member 32 that are disposed with a predetermined gap in an up-down direction.

In each of the front upper member 31 and the front lower member 32, a coupling hole 33 is formed.

In the front end of each side frame 21, a front insertion support member 34 is provided that can be inserted between the front upper member 31 and the front lower member 32 in the front support member 30.

The front insertion support member 34 is formed in a cylindrical shape extending in the up-down direction, and a cylindrical portion of the front insertion support member 34 forms a coupling hole.

Inside the front insertion support member 34, a cylindrical collar 35 made of a metal material can be inserted.

Furthermore, the front insertion support member 34 is formed with a height dimension slightly smaller than a gap dimension between the upper member and the lower member in the front support member 30, and the front insertion support member 34 can be inserted between the upper member and the lower member.

Then, a bolt 36 as a first coupling member is inserted into the coupling hole 33 and the cylindrical portion (coupling hole) of the front insertion support member 34, and the bolt 36 is tightened with a nut 37, in a state where the front insertion support member 34 is inserted between the front upper member 31 and the front lower member 32, to couple and fix the front upper member 31 and the front lower member 32 to the front insertion support member 34.

This state is referred to as the first state where lawn can be mowed to be low.

Also, as shown in FIGS. 8 to 11, each front insertion support member 34 is disposed on a lower surface side of the front lower member 32, and the bolt 36 is inserted into the coupling hole 33 and the cylindrical portion of the front insertion support member 34, and is tightened with the nut 37, so that the grass mower can be supported in the second state where lawn can be mowed to be high.

In the second state, a gap member 38 is provided to cover an outer peripheral side of each bolt 36 between the front upper member 31 and the front lower member 32. The gap member 38 is formed of, for example, an elastic body of resin, rubber or the like.

The first state and the second state indicate that the front frame 22 is supported in states different from each other in height approximately by only the height dimension of the front insertion support member 34.

Also, as shown in FIGS. 6, 7, 12 and 13, a rear support member 40 is provided in each rear corner of the front frame 22. The rear support member 40 is formed in a concave shape recessed inwardly from a side surface of the front frame 22, and the rear support member 40 includes a rear upper member 41 and a rear lower member 42.

At a position corresponding to the rear support member 40 that is a middle portion of each side frame 21, a rear insertion support member 43 being formed in a convex shape entering a recess portion of the rear support member 40 is provided. The rear insertion support member 43 is disposed laterally (inwardly) with respect to a front-rear direction of the side frame 21.

Then, a bolt 44 as a second coupling member is inserted into each coupling hole 33 and a cylindrical portion (coupling hole) of the rear insertion support member 43, and the bolt 44 is tightened with a nut 45, in a state where the rear insertion support member 43 is inserted between the rear upper member 41 and the rear lower member 42, to couple and fix the rear upper member 41 and the rear lower member 42 to the rear insertion support member 43. This state is referred to as the first state.

Also, as shown in FIGS. 8 to 13, each rear insertion support member 43 is disposed on a lower surface side of the rear lower member 42, and the bolt 44 is inserted into the coupling hole 33 and the cylindrical portion of the rear insertion support member 43, and the bolt 44 is tightened with the nut 45, so that the grass mower can be supported in the second state where lawn can be mowed to be high.

In the second state, the gap member 38 made of an elastic material that covers an outer peripheral side of each bolt 44 between the rear upper member 41 and the rear lower member 42 is provided.

Next, description will be made as to an operation of the present embodiment.

In the present embodiment, each bolt 36 as the coupling member is inserted into the coupling hole 33 and the cylindrical portion of the front insertion support member 34, and the bolt 36 is tightened with the nut 37, in the state where the front insertion support member 34 is inserted between the front upper member 31 and the front lower member 32, to couple and fix the front upper member 31 and the front lower member 32 to the front insertion support member 34.

At the same time, each bolt 44 as the coupling member is inserted into the coupling hole 33 and the cylindrical portion of the rear insertion support member 43, and the bolt 44 is tightened with the nut 45, in the state where the rear insertion support member 43 is inserted between the rear upper member 41 and the rear lower member 42, to couple and fix the rear upper member 41 and the rear lower member 42 to the rear insertion support member 43.

Consequently, the working machine body 13 supported in the front frame 22 can be held in the first state.

In this first state, for example, lawn can be mowed at a mowing height of 20 to 60 mm.

In this case, each side frame 21 is temporarily fixed with the front support member 30 and the front insertion support member 34, the bolt 36 and the nut 37 at a front end portion of the side frame, and afterward, the side frame 21 is rotated along a side part of the rear frame 20, to temporarily fix the rear support member 40 and the side frame 21. Finally, the front support member 30, the rear support member 40 and the side frame 21 are finally tightened, which facilitates assembling.

Also, each front insertion support member 34 is disposed on the lower surface side of the front lower member 32, and the bolt 36 is inserted into the coupling hole 33 and the cylindrical portion of the front insertion support member 34, and the bolt 36 is tightened with the nut 37, to couple and fix the front insertion support member 34 to the lower surface side of the front lower member 32.

At the same time, each rear insertion support member 43 is disposed on the lower surface side of the rear lower member 42, and the bolt 44 is inserted into the coupling hole 33 and the cylindrical portion of the rear insertion support member 43, and the bolt 44 is tightened with the nut 45, to couple and fix the rear insertion support member 43 to the lower surface side of the rear lower member 42.

Consequently, the working machine body 13 supported in the front frame 22 can be held in the second state.

In this second state, for example, lawn can be mowed at a mowing height of 60 to 100 mm.

As described above, in the present embodiment, the grass mower includes the traveling machine body 12 including the traveling motor 10 (driving source) and the driving wheels 11 (driving part) driven by the traveling motor 10, and the working machine body 13 including the mowing blade, the working machine body 13 being coupled to the traveling machine body 12. The front frame 22 that supports the working machine body 13 includes the front support member 30 and the rear support member 40, and each side frame 21 that supports the traveling machine body 12 includes the front insertion support member 34 and the rear insertion support member 43 that can be inserted into the front support member 30 and the rear support member 40, respectively. The grass mower includes the bolts 36 and 44 (first and second coupling members) that are couplable selectively in the first state where the front insertion support member 34 and the rear insertion support member 43 are inserted between the front upper member 31 and the rear upper member 41, and the front lower member 32 and the rear lower member 42, and the second state where the front insertion support member 34 and the rear insertion support member 43 are mounted on lower surfaces of the front lower member 32 and the rear lower member 42, respectively.

Consequently, a mowing work can be performed at two mowing heights by selecting the first state or the second state, and coupling and fixing the front support member 30 and the rear support member 40 to the front insertion support member 34 and the rear insertion support member 43, respectively. Therefore, mowing height adjustment can be performed in a comparatively large range with one type of frame configuration, and multiple frame configurations do not have to be prepared for the mowing height adjustment, and additionally, manufacturing cost can be reduced.

Also, in the present embodiment, the front upper member 31 and the rear upper member 41, the front lower member 32 and the rear lower member 42, and the front insertion support member 34 and the rear insertion support member 43 are provided with the coupling holes 33, respectively, and the bolts 36 and 44 (first and second coupling members) are passed through the coupling holes 33 to couple the front upper member 31 and the rear upper member 41, and the front lower member 32 and the rear lower member 42, to the front insertion support member 34 and the rear insertion support member 43.

Consequently, the front support member 30 and the rear support member 40, and the front insertion support member 34 and the rear insertion support member 43 can be coupled and fixed only by inserting the bolts 36 and 44.

In this case, each side frame 21 is temporarily fixed to the front support member 30 at a front end portion of the side frame 21, and afterward the side frame 21 is rotated along the side part of the rear frame 20, to temporarily fix the rear support member 40 and the side frame 21. Then the front support member 30, the rear support member 40 and the side frame 21 are finally tightened, so that the assembling can be performed easily.

Further, in the present embodiment, the front insertion support member 34 is disposed in the front end of the side frame 21, and the rear insertion support member 43 is disposed laterally with respect to the front-rear direction of the side frame 21.

Consequently, the front insertion support member 34 and the rear insertion support member 43 can firmly support the front frame 22 (working machine body) being coupled to the side frame 21 in the front and rear.

Also, the present embodiment includes the gap member 38 that surrounds a gap between the front upper member 31 or rear upper member 41 and the front lower member 32 or rear lower member 42 in the bolt 36 or 44 (coupling member), during coupling in the second state.

Consequently, a periphery of the bolt 36 or 44 can be covered.

Further, in the present embodiment, the gap member 38 is the elastic body.

Consequently, the periphery of the bolt 44 can be covered with the gap member 38 being composed of the elastic body. Further, since the gap member 38 is the elastic body, the gap member 38 contracts in the up-down direction during tightening of the bolt 44, and the gap member can be attached further closely to the rear upper member 41 or the rear lower member 42, and can be firmly fixed.

Also, the present embodiment includes the metal collar 35 disposed between the bolt 36 or 44 (coupling member) and the gap member 38.

Consequently, the collar 35 eliminates gaps between the front insertion support member 34 and rear insertion support member 43, and the bolts 36 and 44, so that occurrence of rattling can be suppressed.

Note that the above embodiment is merely one aspect of the present invention, and can be arbitrarily modified and applied without departing from the scope of the gist of the present invention.

For example, in the above embodiment, the front insertion support member 34 and the rear insertion support member 43 are disposed on the lower surface sides of the front support member 30 and the rear support member 40, respectively, to constitute the second state. Alternatively, the front insertion support member 34 and the rear insertion support member 43 may be disposed on upper surface sides of the front support member 30 and the rear support member 40, respectively. In this case, this state may be considered the second state, or a third state.

Furthermore, the front support member 30 and the rear support member 40 may be provided in each side frame 21, and the front insertion support member 34 and the rear insertion support member 43 may also be provided in the front frame 22.

REFERENCE SIGNS LIST

1 grass mower
10 traveling motor
11 driving wheel
12 traveling machine body
13 working machine body
14 steering wheel
20 rear frame
21 side frame
22 front frame
30 front support member
31 front upper member
32 front lower member
33 coupling hole
34 front insertion support member
35 collar
36 bolt
37 nut
38 gap member
40 rear support member
41 rear upper member
42 rear lower member
43 rear insertion support member
44 bolt
45 nut

What is claimed is:

1. A grass mower comprising:
a traveling machine body comprising a driving source and a driving part driven by the driving source; and
a working machine body comprising a mowing blade, the working machine body being coupled to the traveling machine body, wherein
one of the traveling machine body and the working machine body comprises a support member including an upper member and a lower member, and
the other machine body comprises an insertion support member being insertable between the upper member and the lower member,
the grass mower comprising a coupling member that is couplable selectively in a first state where the insertion support member is inserted between the upper member and the lower member, and a second state where the insertion support member is mounted on an upper surface of the upper member or a lower surface of the lower member.

2. The grass mower according to claim 1, wherein each of the upper member, the lower member and the insertion support member is provided with a coupling hole, and
the coupling member is passed through the coupling hole to couple the upper member and the lower member to the insertion support member.

3. The grass mower according to claim 1, wherein the coupling member comprises:
a first coupling member that couples the traveling machine body with the working machine body in the front; and
a second coupling member that couples the traveling machine body with the working machine body in the rear.

4. The grass mower according to claim 3, wherein the insertion support member comprises:
a front insertion support member being coupled with the first coupling member member; and
a rear insertion support member being coupled with the second coupling member,
the front insertion support member is disposed in a front end of the traveling machine body or of the working machine body, and
the rear insertion support member is disposed laterally with respect to a front-rear direction.

5. The grass mower according to claim 1, further comprising:
a gap member that surrounds a gap between the upper member and the lower member in the coupling member, during coupling in the second state.

6. The grass mower according to claim 5, wherein the gap member is an elastic body.

7. The grass mower according to claim 6, further comprising:
a metal collar disposed between the coupling member and the gap member.

8. The grass mower according to claim 1, further comprising:
two side frames each comprising the driving part,
a rear frame comprising the driving source, and
a front frame comprising the mowing blade and a mowing blade driving source that drives the mowing blade.

9. The grass mower according to claim 8, wherein the side frame and the front frame are coupled with the coupling member.

* * * * *